United States Patent
Burch, Jr. et al.

(10) Patent No.: US 7,136,981 B2
(45) Date of Patent: Nov. 14, 2006

(54) METHOD AND APPARATUS FOR CREATING A VIRTUAL STORAGE VOLUME WITH A FILE SIZE INDEPENDENT OF A FILE SIZE LIMITATION

(75) Inventors: Charles Carroll Burch, Jr., Sandia Park, NM (US); William Meredith Menger, Houston, TX (US); Roger A. Heflin, Ponca City, OK (US); Charles Ivan Burch, Ponca City, OK (US); Donna Kay Vunderink, Burbank, OK (US); Richard Salisbury Day, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 1047 days.

(21) Appl. No.: 09/951,113

(22) Filed: Sep. 13, 2001

(65) Prior Publication Data

US 2003/0051117 A1  Mar. 13, 2003

(51) Int. Cl.
*G06F 12/00* (2006.01)
*G06F 13/00* (2006.01)
(52) U.S. Cl. .................. 711/170; 711/154; 711/173
(58) Field of Classification Search .............. 711/4, 711/105, 173, 100, 154, 170
See application file for complete search history.

(56) References Cited

U.S. PATENT DOCUMENTS

| | | | |
|---|---|---|---|
| 6,374,336 B1 | 4/2002 | Peters et al. | ............... 711/167 |
| 6,745,286 B1 * | 6/2004 | Staub et al. | ............... 711/114 |
| 6,754,773 B1 * | 6/2004 | Ulrich et al. | ............... 711/118 |

OTHER PUBLICATIONS

Woodhull, Albert S.; Echanging Data between Minix and Other OS File Systems; revised Mar. 14, 2004; from http://minix1.bio.umass.edu/faq/datxchng.html.*
SunOS 5.9 Man Page for growfs; Jan. 18, 2001 from http://bama.ua.edu/cgi-bin/man-cgi?growfs+ 1M.*
Goodheart et al., "The Magic Garden Explained", *The Internals of UNIX® System V Release 4: An Open Systems Design*, Copyright 1994 by Prentice Hall of Australia Pty Ltd, 2 cover pages and pp. 27, 28, 38, 60 and 61.
"CEWES MSRC Scalable Parallel Programming Tools Software Catalog", website: http://www.rs6000.ibm.com/software/sp_products/piofs.html, Jan. 29, 1999, 1 page.
"IBM AIX Parallel I/O File System for IBM RS/6000 SP V1.2", website: http://www-jics.cs.utk.edu/SP2/piofsv12.html, May 28, 1997, 8 pages.
"DG/UX (V.4.2)", website: http://techupdate.cnet.com/enterprise/0-6133429-723-3730757.html, Apr. 12, 2000, 5 pages.

* cited by examiner

*Primary Examiner*—Tuan V. Thai
(74) *Attorney, Agent, or Firm*—ConocoPhillips Company

(57) ABSTRACT

A method and apparatus for creating a virtual storage volume with a file size independent of a file size limitation of a computer. In one embodiment, a storage area is randomly selected from among a plurality of available storage areas. A determination is made as to whether the selected storage area contains at least a predetermined amount of free space. If so, the predetermined amount of free space is allocated on the selected storage area to create an allocated storage area. A symbolic link to the allocated storage area is written in a directory associated with the virtual storage volume. Data destined for the virtual storage volume is then written in the allocated storage area.

20 Claims, 4 Drawing Sheets

METHOD AND APPARATUS FOR CREATING A VIRTUAL STORAGE VOLUME WITH A FILE SIZE INDEPENDENT OF A FILE SIZE LIMITATION

FIELD OF THE INVENTION

The present invention relates generally to file systems for computers, and more particularly, to a method and apparatus for creating a virtual storage volume with a file size independent of a file size limitation imposed by a computer file system.

BACKGROUND OF THE INVENTION

An operating system is a program that is used to manage other programs (i.e., application programs) in a computer system. In a typical computer system, the operating system is initially loaded into the computer by a boot program. Once loaded, the operating system can perform a number of services for the application programs. Such services include determining the order in which certain applications can run, managing the sharing of resources (e.g., memory) between the applications, and managing input and output to and from hardware devices, such as disk drives. The application programs make use of the operating system by requesting services, for example, through the use of an application programming interface (API). A user of the computer system can also interact directly with the operating system, for example, through the use of a graphical user interface (GUI).

With respect to managing input and output between the application programs and one or more hardware devices, each type of operating system is typically closely related to and may be designed to work with a specific file system that manages the data on the disk drives. Some examples of operating systems include Unix, Linux (a variant of Unix) and Windows.

A file system typically specifies a convention for naming files, including, for example, the maximum number of characters in a file name, the type of characters that can be used, the format of file extensions that are permitted, etc. The file system also specifies the algorithmic or logical locations where a file can be placed. Windows and Unix-based operating systems typically employ file systems that use a hierarchical or tree-like structure wherein a file is placed in a directory or subdirectory located at a particular position in the hierarchical structure.

Depending on the addressing structure used, a file system can possess two different but related constraints: a limitation on the maximum size of an individual file, and a limitation on the maximum size of the file system itself.

The size of an individual file may be physically limited by the number of bits used in describing an address space of the file. For example, some versions of Linux, which were designed for use with a hardware architecture of 32 bits, use a four byte integer to address the contents of a file. Thus, the maximum size of a file is limited to $2^{31}$ bytes minus some number of bytes, i.e., about 2 gigabytes.

The size of the file system itself is also limited. While the address space of a file system is typically represented by all or part of an eight byte integer, the maximum size of the file system is usually set to a predetermined limit. Limiting the maximum size of the file system provides a number of advantages. For example, the computer system may require less memory and may be able to locate files faster than if the file system were larger. On older Linux systems, for example, the maximum size of the file system was set at one terabyte. That is, regardless of the size of a physical disk, the disk must be divided into a plurality of partitions, each of which is less than or equal to the maximum allowable size of the file system.

In many applications, particularly seismic applications, a maximum file size of, for example, 2 gigabytes can be very restrictive. Seismic work typically involves the processing of large volumes of seismic data. These volumes of data often span hundreds of magnetic tapes, and can be several hundred gigabytes in size. Typically, as seismic data tapes are entered into a system, the contents of several tapes are copied to multiple files in one directory or data storage area. Then, when that data storage area becomes full, subsequent tapes are copied to many other data storage areas, which can be scattered around the computer system. Because the maximum size of the file system may be limited, for example, to 1 terabyte, one data storage area may not have sufficient free space to hold all of the incoming data. Thus, the user is required to manage the data by recording the locations (in the various data storage areas) of each part of the data. Accordingly, a need exists for a method for creating a virtual storage volume with a file size independent of a file size limitation imposed by the file system used by a computer system.

SUMMARY OF THE INVENTION

One aspect of the present invention is directed to a method and apparatus for creating a virtual storage volume having a size that is independent of a file size limitation of a computer system. A physical storage area is randomly selected from among a plurality of available physical storage areas. A determination is made as to whether the selected physical storage area contains at least a predetermined amount of free space. If so, free space corresponding to the predetermined amount is allocated on the selected physical storage area. A symbolic link to the allocated physical storage area is written in a user's directory which is then associated with the virtual storage volume. Data associated with a file which is destined for the virtual storage volume can then be written in the allocated physical storage area. Once the allocated physical storage area has been exhausted, if there remains a need to store additional data associated with the same file, the above steps can be repeated to create another allocated physical storage area, with a symbolic link thereto being written in the user's directory previously described. Thus, the size of the virtual storage volume can exceed the file size limitation of the computer system.

Another aspect of the present invention is directed to a method and apparatus for performing a file operation with respect to a virtual storage volume having a file size that is independent of a file size limitation of a computer system. A symbolic link, which is located in a user's directory, is read. The symbolic link points to an allocated storage area, which had been randomly selected from among a plurality of available storage areas. The file operation is then performed with respect to the allocated storage area.

BRIEF DESCRIPTION OF THE DRAWINGS

A more complete understanding of the present invention and its advantages will be readily apparent from the following Detailed Description of the Preferred Embodiments taken in conjunction with the accompanying drawings. Throughout the accompanying drawings, like parts are designated by like reference numbers and in which.

DETAILED DESCRIPTION OF THE PREFERRED EMBODIMENTS

Figure 1:
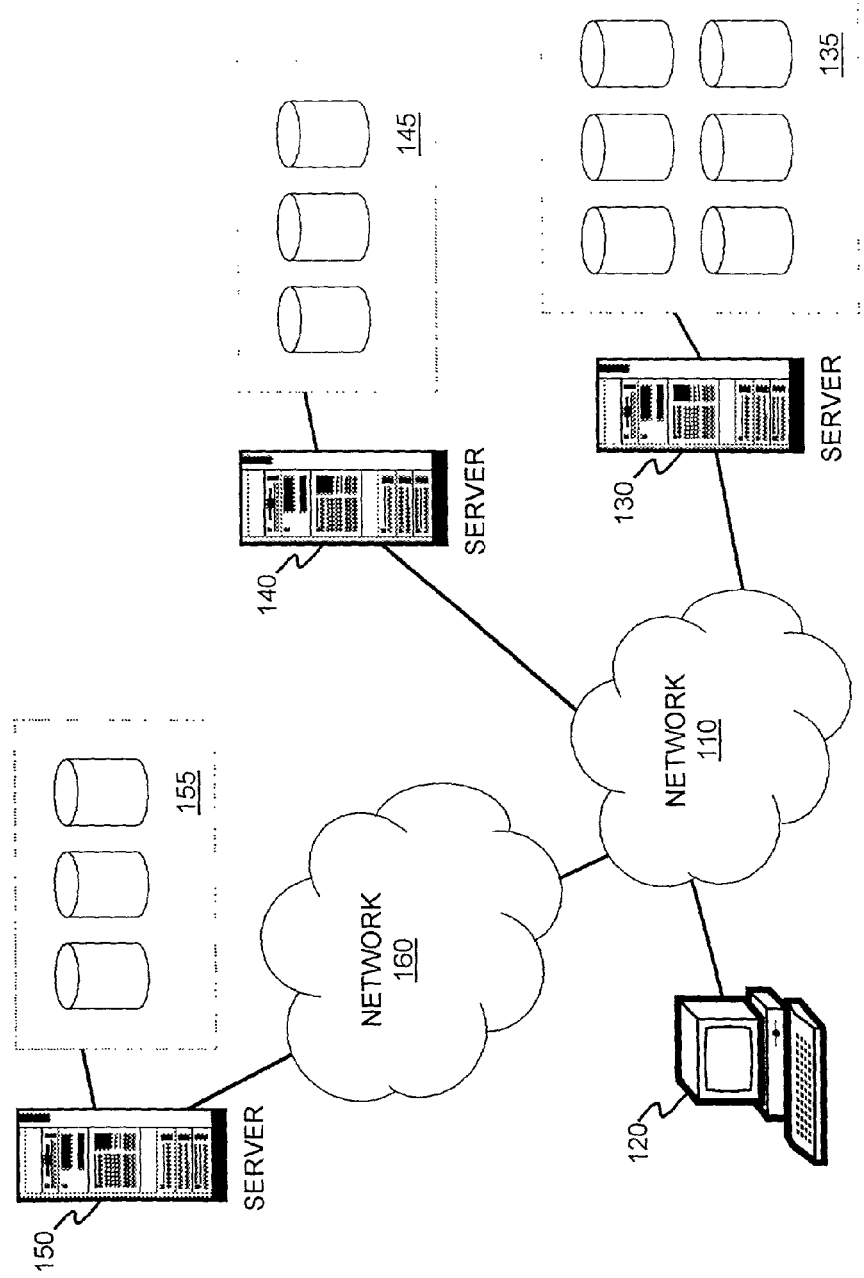
FIG. 1 is a schematic illustration of a computer network in accordance with the present invention.

FIG. 1 schematically illustrates a hardware environment of an embodiment of the present invention. A first communications network 110 provides an electronic communications medium that connects a user at a client computer 120 to first and second server computers 130, 140. The first and second server computers 130, 140 respectively run first and second operating systems and have respective file systems associated therewith for interfacing to first and second storage arrays 135, 145. The first and second operating systems can be different operating systems or can be the same operating system.

The client computer 120 is also connected to a third server computer 150 via a second communications network 160. The third server computer 150 runs a third operating system having an associated file system for interfacing to a third storage array 155. Each of the first, second, and third storage arrays 135, 145, 155 can include a plurality of storage devices or can be a single storage device. Storage device as used herein can encompass hard disk drives, tape drives, solid state memory devices, or other types of storage devices. The third operating system can be different from the first and second operating systems or can be the same operating system.

The client computer 120 can be a personal computer or a workstation. The server computers 130, 140, 150 can be personal computers, workstations, minicomputers, or mainframes. The client computer 120 and the server computers 130, 140, 150 can be bi-directionally coupled to the first and second communications networks 110, 160 over communications lines, via wireless systems, or any combination thereof. For example, client computer 120 and the server computers 130, 140, 150 can be coupled to one another by various private networks, public networks or any combination thereof, including local-area networks (LANs), wide-area networks (WANs), or the Internet. Those skilled in the art will recognize many modifications that can be made to this configuration without departing from the scope of the present invention.

A virtual storage volume can be created in accordance with the present invention, for example, by a user at the client computer 120 creating a file in the user's directory, or loading data from a tape or other storage device to a file in the user's directory. Conventionally, files located in the user's directory are conventionally subject to a number of constraints: the maximum file size, the maximum filesystem size, and the size of the user's local hard disk drive. The present invention advantageously allows the user to disregard these conventional constraints and to treat the user's directory as a substantially unlimited data storage area. Thus, the user can process and load data by manipulating what appears to the user to be a single file within the user's directory structure.

Figure 2:
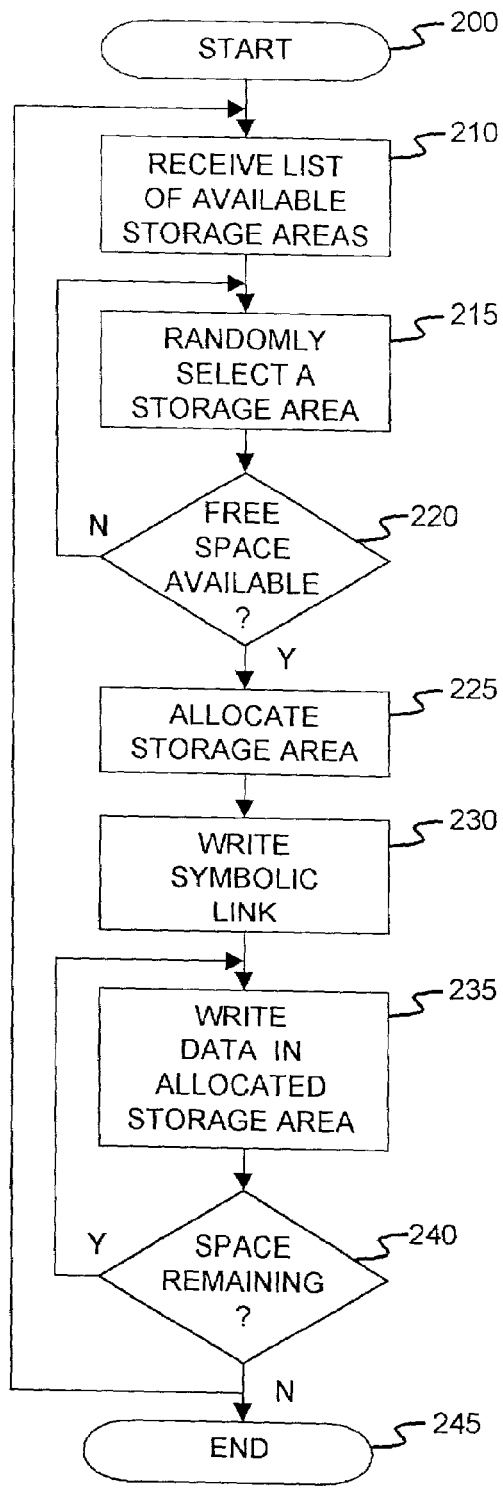
FIG. 2 is a flow diagram illustrating a method for creating a virtual storage volume in accordance with the present invention.

FIG. 2 is a flow diagram illustrating the operation of a computer, in creating a virtual storage volume in accordance with the present invention. The virtual storage volume can be created in a directory associated with a particular user (a user's directory), and can be created by the computer as a result of the user creating a file or writing to a file in the user's directory. The method of creating the virtual storage volume can be implemented in a computer program, or alternatively, can be implemented as a subroutine library, which is called by a computer program and integrated into the computer program.

The process starts at step 200. In step 210, the computer receives a list of available storage areas which can be located in various file systems. The list can indicate only those storage areas that a particular user is permitted to access, or can indicate at least a portion of the storage areas that are connected to and accessible by the computer via one or more networks, such as the first and second communications networks 110, 160. In step 215, the computer randomly selects a storage area from among the available storage areas listed. The computer can also randomly select a storage area without employing the list of available storage areas. In this case, the computer can select a storage area from among the storage areas to which it is connected or has access.

Then, in step 220, the computer determines whether the selected storage area contains at least a minimum amount of free (e.g., unused or unallocated) space. The amount of free space required can be determined by a system administrator based on the total amount of storage space available, or can be based on other considerations. For example, the use of about a 250 megabyte block of space can result in more efficient utilization of available storage space, while the use of about a 2 gigabyte block can result in more efficient data transfer. The system administrator can set the required amount of free space via a parameter (e.g., a block size parameter) associated with the virtual storage volume. The computer can then look for an amount of free space in the selected storage area based on information representing the block size, which is stored in the parameter. The system administrator can also adjust the size of the block (e.g., based on currently available resources, such as the amount of available hard drive space) by editing the data stored in the block size parameter.

If the selected storage area has at least the required amount of free space available (Yes in step 220), the process proceeds to step 225. If the selected storage area does not have at least the predetermined amount available (No in step 220), the process returns to step 215, wherein the computer randomly selects another storage area.

By randomly selecting a storage area, rather than selecting the storage area having the most amount of free space, the process of the present invention advantageously distributes input/output activity among the various server computers 130, 140, 150 and associated storage arrays 135, 145, 155. The random selection of a storage area provides the advantage that, even when multiple users are creating their respective virtual storage volumes, the allocated storage areas are likely to be in different file systems. Thus, multiple users are not likely to be accessing the same file systems at the same time, which can cause an input/output bottleneck to occur.

Then, in step 225, the computer allocates an amount of free space in the selected storage area that is equal to the required amount. The amount of free space allocated can be determined, for example, by the block size parameter. In step 230, the computer writes a symbolic link to the allocated storage area in the user's directory. The symbolic link points to and enables access to the allocated storage area.

In step 235, the computer writes the data to be stored in the virtual storage volume in the allocated storage area. As data is written into the allocated storage area, the amount of space remaining will diminish. As long as there is space available in the allocated storage area, additional data can be placed there. However, once there is no more space remaining in the allocated storage area (No in step 240), and if there remains additional data to be stored in the virtual storage volume, the process returns to step 215 wherein another storage area is randomly selected. Alternatively, the process can return to step 210 to receive a list of available storage areas, which list can be changed, for example, due to network conditions, since the last time that a storage area was selected. If no additional data is to be stored in the virtual storage volume, the process ends at step 245.

The process thus allows a large number of allocated storage areas to be linked to a single virtual storage volume, such that the total amount of space available for a single file (i.e., the aggregate of the allocated storage areas) is greater than the maximum allowable file size as determined by the operating system. Further, as the allocated storage areas can be on different file systems, the total amount of space available can be greater than the maximum size of any particular file system.

Figure 3:
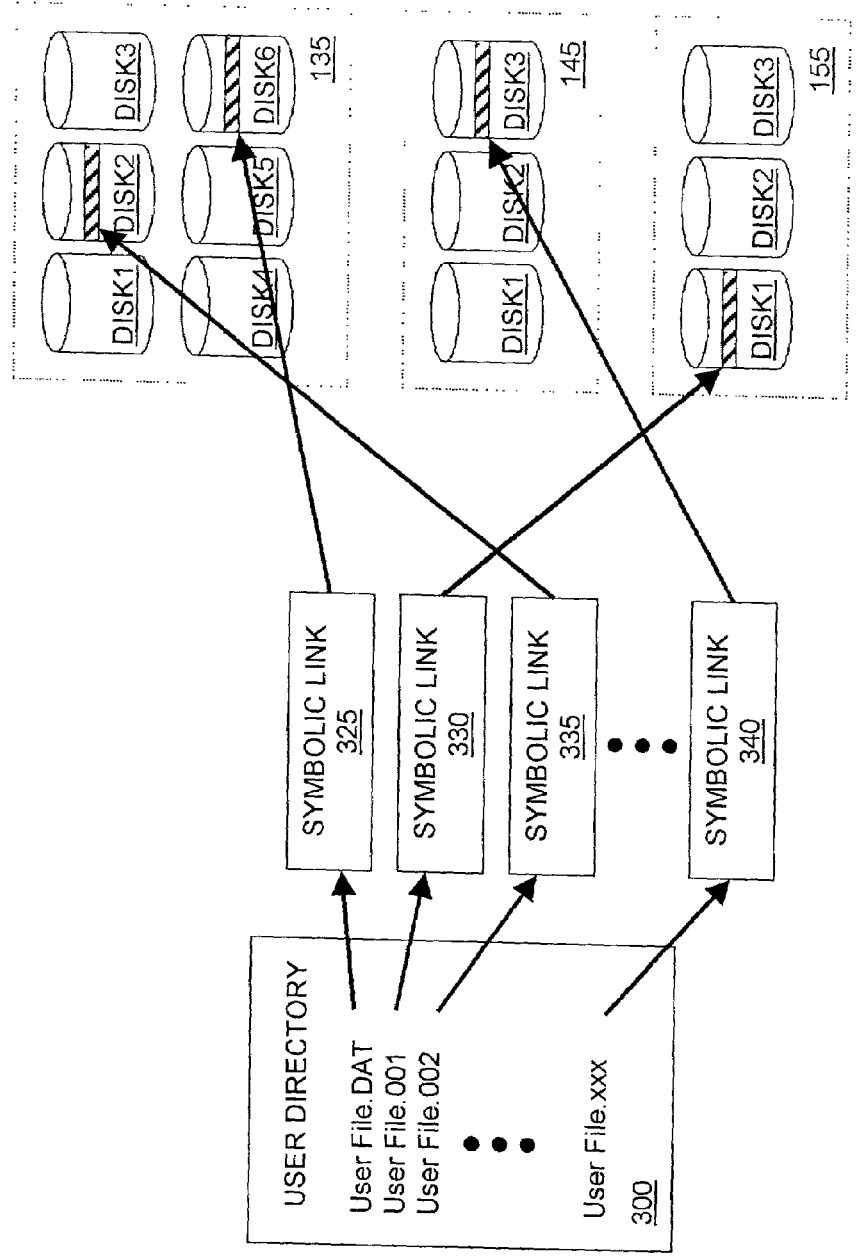
FIG. 3 is a block diagram illustrating a user's directory and showing symbolic links from the user's directory to a plurality of file systems in accordance with the present invention.

FIG. 3 is a block diagram illustrating the relationship between a virtual storage volume, which is located in a user's directory 300, the symbolic link representing the virtual storage volume, and the actual data, which are distributed between various ones of the first, second, and third storage devices 135, 145, 155. The user's directory 300 contains a virtual storage volume named "UserFile", which consists of a plurality of files, respectively named "UserFile.DAT", "UserFile.001", "UserFile.002", . . . "UserFile.xxx". Each of the files "UserFile.DAT", "UserFile.001", "UserFile.002", . . . "UserFile.xxx" contains a symbolic link that points to a storage area on one of the first, second, or third storage arrays 135, 145, 155.

More specifically, in this embodiment, the file "UserFile.DAT" contains a symbolic link 325 that points to a disk DISK6 in the first storage array 135. Likewise, the files "UserFile.001", "UserFile.002", and "UserFile.xxx" respectively contain symbolic links 330, 335, 340 that respectively point to DISK1 in the third storage array 155, DISK2 in the first storage array 135, and DISK3 in the second storage array 145. As the allocated storage areas are randomly selected from among the available storage areas, the files associated with the virtual storage volume are randomly interspersed among the first, second, and third storage devices 135, 145, 155.

In the embodiment of FIG. 3, the allocated storage areas and the user's directory containing the virtual storage volume are located in different file systems. In other embodiments, depending on the size of the user's directory, at least a portion of the allocated storage areas can be located in the same file system as the user's directory containing the virtual storage volume.

While the embodiment of FIG. 3 allows the user to see each of the plurality of symbolic links representing the files that make up the virtual storage volume, in other embodiments, the constituent files of the virtual storage volume can be hidden from the user and represented by a single symbolic link which points to all of the allocated storage areas used to create the virtual storage volume. The user can thus only see one symbolic link in the user's directory for each virtual storage volume.

Figure 4:
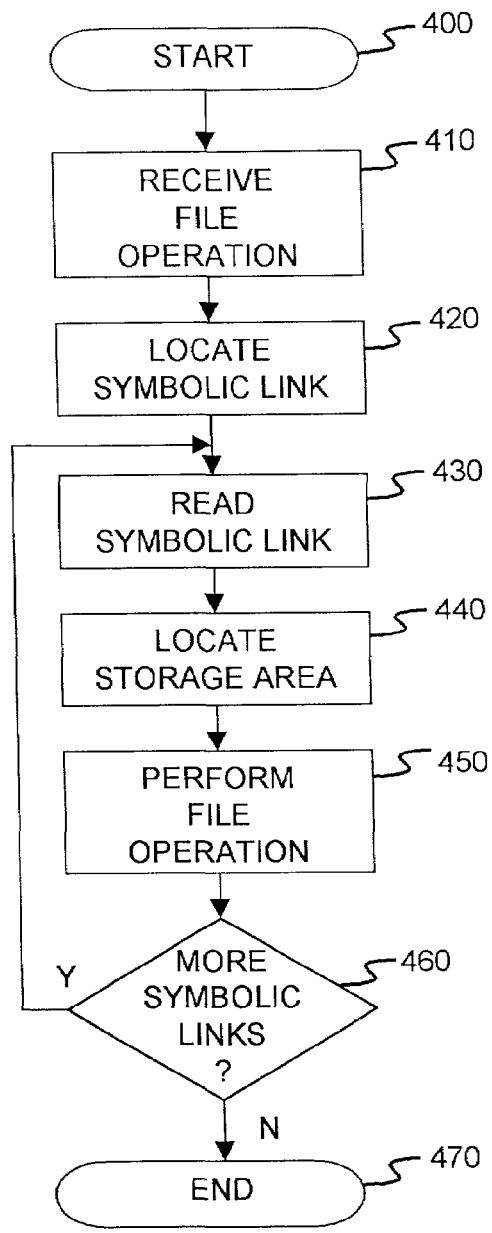
FIG. 4 is a flow diagram illustrating a method for performing a file operation with respect to a virtual storage volume in accordance with the present invention.

FIG. 4 is a flow diagram illustrating the operation of a computer, in performing a file operation with respect to a virtual storage volume in accordance with the present invention. The virtual storage volume can be located in a user's directory. The method of performing a file operation with the virtual storage volume can be implemented in a computer program, or alternatively, can be implemented as a subroutine library, which is called by a computer program and integrated into the computer program.

The process starts at step 400. In step 410, the computer receives an instruction to perform a file operation with respect to the virtual storage volume. For example, the instruction can be to read or load into memory a virtual storage volume named "UserFile".

In step 420, the computer locates a symbolic link associated with the virtual storage volume. In the embodiment of FIG. 3, virtual volume "UserFile" includes a file named "UserFile.DAT" containing a symbolic link 325. Then, in step 430, the computer reads the symbolic link (e.g., symbolic link 325 of the file "UserFile.DAT"), which points to an allocated storage area (e.g., DISK6 of the first data storage area 135). The file containing the symbolic link is preferably located in a directory associated with the virtual storage volume, such as the user's directory 300.

Then, in step 440, the computer locates the allocated storage area pointed to by the symbolic link. The computer then performs the requested file operation (step 450) with respect to the allocated storage area pointed to by the symbolic link (e.g., DISK 6 of the first data storage area 135). Once the file operation has been performed with respect to a first allocated storage area of the virtual storage volume, the process returns to step 430 to read a second file associated with the virtual storage volume (e.g., "UserFile.001"), locate the next allocated storage area, and perform the file operation with respect to the allocated storage area. Thus, the process repeats steps 430 through 440 until the file operation has been performed with respect to all the files of the virtual storage volume (No in step 460). The process then ends at step 470.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. A method, using a computer system, for creating a virtual storage volume having a size independent of a file size limitation of said computer system, wherein data to be written to an allocated storage area exceeds an amount of free space remaining in a first storage area, the method comprising the steps of:

randomly selecting a first storage area from among a plurality of available storage areas;

determining whether said selected first storage area contains at least a predetermined amount of free space;

allocating said predetermined amount of said free space on said selected first storage area to create a first allocated storage area;

writing a symbolic link to said first allocated storage area in a directory;

writing at least a portion of data destined for said vital storage volume in said first allocated storage area;

randomly selecting a second storage area from among said plurality of available storage areas;

determining whether said second selected storage area contains at least a second predetermined amount of free space;

allocating said second predetermined amount of said free space on said second selected storage area to create a second allocated storage area;

writing a second symbolic link to said second allocated storage area in said directory; and writing at least a portion of said data to said second allocated storage area.

2. A method in accordance with claim 1, wherein said size of said virtual storage volume is independent of a file-system size limitation of said computer system.

3. A method in accordance with claim 1, wherein said first and second allocated storage areas and said directory are located on different file systems.

4. A method in accordance with claim 1, wherein said step of randomly selecting a first and second storage areas comprises randomly selecting said first and second storage areas from a list of said plurality of available storage areas.

5. A method in accordance with claim 1, wherein said plurality of available storage areas are connected to said computer system via a communications network.

6. A method in accordance with claim 1, wherein said predetermined amount is determined by a parameter associated with said virtual storage volume.

7. A computer readable medium, having computer executable instructions stored therein, for creating a virtual storage volume having a size independent of a file size limitation of a computer, wherein data to be written to said allocated storage area exceeds an amount of free space remaining in a first allocated storage area said computer executable instructions comprising:

instructions for randomly selecting a first storage area from among a plurality of available storage areas;

instructions for determining whether said first selected storage area contains at least a predetermined amount of free space;

instructions for allocating said predetermined amount of said free space on said selected first storage area to create an allocated storage area;

instructions for writing a symbolic link to said first allocated storage area in a directory;

instructions for writing at least a portion of data destined for said virtual storage volume in said first allocated storage area;

instructions for randomly selecting a second storage area from among said plurality of available storage areas;

instructions for determining whether said second selected storage area contains at least a second predetermined amount of free space;

instructions for allocating said second predetermined amount of said free space on said second selected storage area to create a second allocated storage area;

instructions for writing a second symbolic link to said second allocated storage area in said directory; and instructions for writing at least a portion of said data to said second allocated storage area.

8. A computer readable medium in accordance with claim 7, wherein said size of said virtual storage volume is independent of a file-system size limitation of said computer system.

9. A computer readable medium in accordance with claim 7, wherein said first and second allocated storage areas and said directory are located on different file systems.

10. A computer readable medium in accordance with claim 7, wherein said instructions for randomly selecting first and second storage areas comprises instructions for randomly selecting said first and second allocated storage areas from a list of said plurality of available storage areas.

11. A computer readable medium in accordance with claim 7, wherein said plurality of available storage areas are connected to said computer via a communications network.

12. A computer readable medium in accordance with claim 7, wherein said predetermined amount is determined by a parameter associated with said virtual storage volume.

13. A computer readable medium in accordance with claim 7, wherein data to be written to said first and second allocated storage areas exceeds an amount of free space remaining in said first and second allocated storage areas, said computer executable instructions further comprising:

(a) instructions for randomly selecting an additional storage area from among a plurality of available storage areas;

(b) instructions for determining whether said selected additional storage area contains at least a predetermined amount of free space;

(c) instructions for allocating said predetermined amount of said free space on said selected storage area to create an additional allocated storage area;

(d) instructions for writing a symbolic link to said additional allocated storage area in a directory;

(e) instructions for writing at least a portion of data destined for said virtual storage volume in said additional allocated storage area; and (f) instructions for repeatedly performing instructions (a) through (d) when data to be written to said additional allocated storage area exceeds an amount of free space remaining on said additional allocated storage area so as to allow said size of said virtual storage volume to exceed said file size limitation.

14. A computer readable medium in accordance with claim 13, wherein said size of said virtual storage volume is independent of a file-system size limitation of said computer system.

15. A computer readable medium in accordance with claim 13, wherein said additional allocated storage area and said directory are located on different file systems.

16. A computer readable medium in accordance with claim 13, wherein said plurality of available storage areas are connected to said computer system via a communications network.

17. A method in accordance with claim 1, wherein data to be written to said first and second allocated storage areas exceeds an amount of free space remaining in said first and second allocated storage area, said method further comprising the steps of:

(a) randomly selecting an additional storage area from among a plurality of available storage areas;

(b) determining whether said selected additional storage area contains at least a predetermined amount of free space;

(c) allocating said predetermined amount of said free space on said selected additional storage area to create an additional allocated storage area;

(d) writing a symbolic link to said additional allocated storage area in a directory;
(e) writing at least a portion of data destined for said virtual storage volume in said additional allocated storage area; and
(f) repeating steps (a) through (d) when data to be written to said additional allocated storage area exceeds an amount of free space remaining on said additional allocated storage area so as to allow said size of said virtual storage volume to exceed said file size limitation.

18. A method in accordance with claim 17, wherein said size of said virtual storage volume is independent of a file-system size limitation of said computer system.

19. A method in accordance with claim 17, wherein said additional allocated storage area and said directory are located on different file systems.

20. A method in accordance with claim 17, wherein said plurality of available storage areas are connected to said computer system via a communications network.

* * * * *